Feb. 18, 1969    MASAO KAWASHIMA ET AL    3,428,886
BROAD FREQUENCY BAND TRANSFORMER
Filed April 14, 1966    Sheet 1 of 5
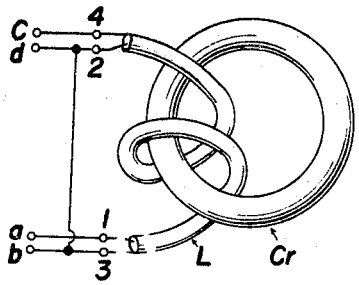
Fig.1a. PRIOR ART
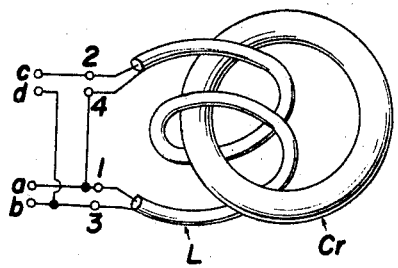
Fig.2a. PRIOR ART
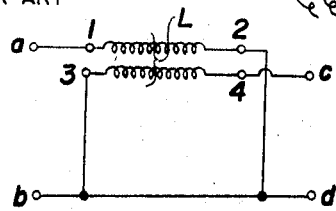
Fig.1b. PRIOR ART
Fig.1d. PRIOR ART
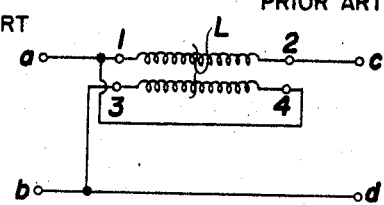
Fig.2b. PRIOR ART
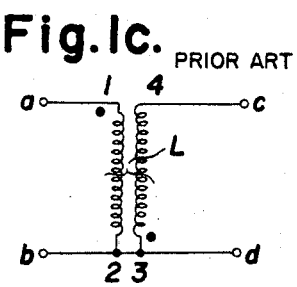
Fig.1c. PRIOR ART
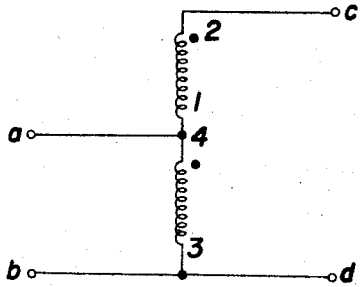
Fig.2c. PRIOR ART
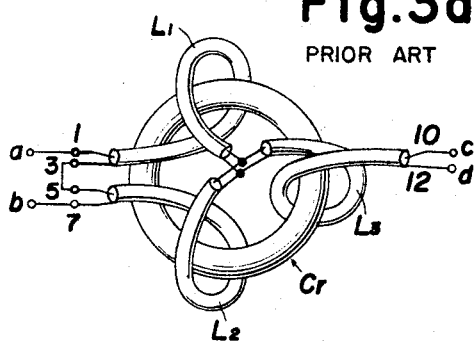
Fig.3a. PRIOR ART
INVENTOR
MASAO KAWASHIMA
et al INVENTOR
MASAO KAWASHIMA
et al

Fig.6a
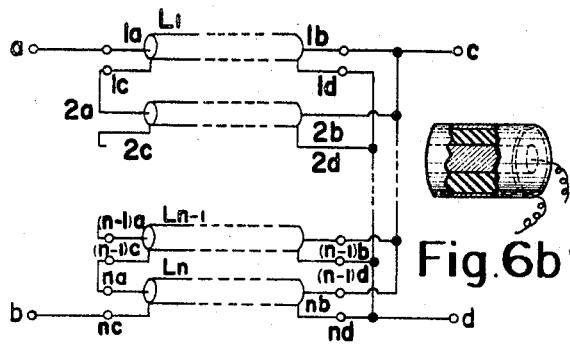
Fig.6b
Fig.7a.
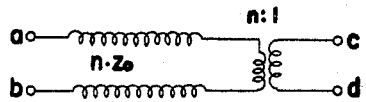
Fig.7b.
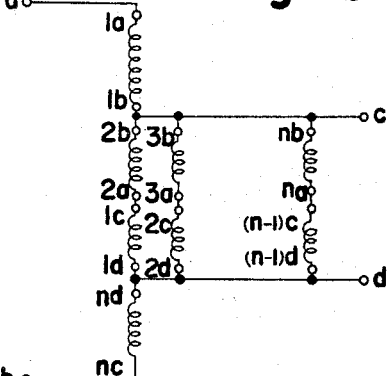
Fig.8a.
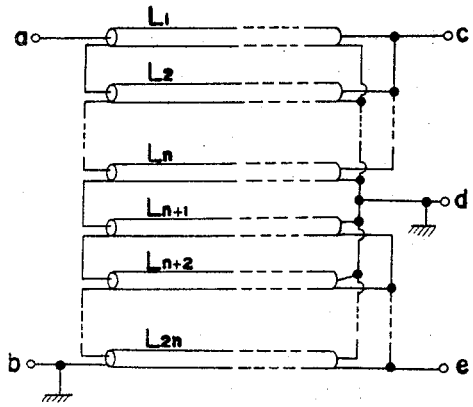
Fig.7c.
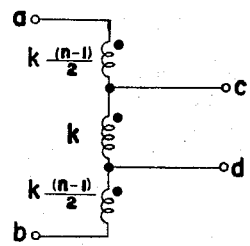
Fig.8b.
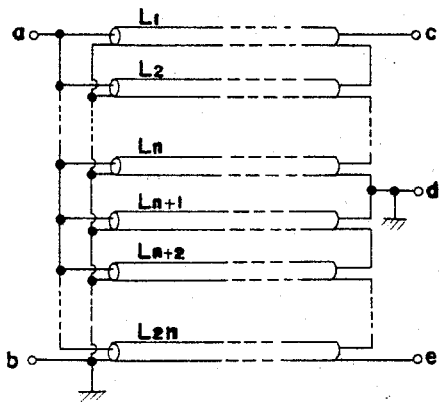
Fig.7d.
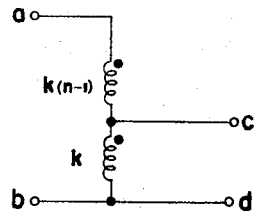
INVENTOR
MASAO KAWASHIMA
et al

United States Patent Office 3,428,886
Patented Feb. 18, 1969

3,428,886
BROAD FREQUENCY BAND TRANSFORMER
Masao Kawashima and Yushi Katagiri, Kawasaki-shi, Japan, assignors to Fujitsu Limited, Kawasaki-shi, Kanagawa-ken, Japan
Filed Apr. 14, 1966, Ser. No. 542,591
Claims priority, application Japan, Apr. 15, 1965, 40/22,340
U.S. Cl. 333—33
Int. Cl. H03h 7/38
5 Claims

ABSTRACT OF THE DISCLOSURE

A broad-band impedance-ratio transformer of the balanced or unbalanced type. A plurality of pairs of transmission lines are wound about a magnetic core and another pair is not so wound. Either the input or output terminals of the lines are series connected, while the other terminals are parallel connected. The number and direction of the turns are set to control the impedance ratio.

---

This invention relates to improvements in and relating to broad frequency band transformers for use in various electronic systems, especially valuable for the blocking oscillators now broadly in use with the ultra-high frequency signal transmission technique.

It is a main object of the invention to provide a broad-band impedance-ratio transformer especially adapted for use as impedance transformer with practically any selected transformation ratio, yet with use of a single core.

It is another object of the invention to provide a broad-band impedance-ratio transformer of the above nature, which is highly compact in its design and economical in the manufacture thereof, in comparison with conventional comparative transformers.

Various further objects, features and advantages of the invention will become apparent as the description proceeds.

FIG. 1a is a schematic explanatory view of a first embodiment of a conventional comparative transformer.

FIGS. 1b and 1c are equivalent circuits of the transformer shown in FIG. 1a, illustrating higher frequency and lower frequency characteristics of the transformer.

FIG. 1d is an enlarged, partial cross-sectional view of line L as used in FIG. 1a.

FIG. 2a is a similar view to FIG. 1a, showing a second embodiment of the conventional art.

FIGS. 2b and 2c are similar views to FIGS. 1a and 1b, respectively, illustrating equivalent circuits of the second embodiment.

FIGS. 3a, 3b and 3c are similar views to FIGS. 1a, 1b and 1c, respectively, plotted in connection with a third comparative conventional embodiment.

FIG. 6a is a schematic circuit diagram in a generalized form for the illustration of the principle of the present invention.

FIG. 6b is an enlarged partial cross-section view of a line as used in FIG. 6a.

FIGS. 7a, 7b and 7c are three different equivalent circuits of the generalized circuit arrangement shown in FIG. 6.

FIGS. 8a and 8b are schematic circuit diagrams illustrating two generalized embodiments of the invention.

Figure 3B:
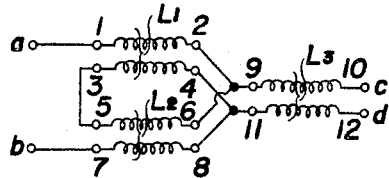

Before entering the detailed description of several preferred embodiments of the invention, three comparative conventional transformers broadly used in the prior art will be illustrated in reference to FIGS. 1–3, for better understanding of the invention. These are distributed constant circuit transformers wherein distributed constant lines such as coaxial lines, parallel lines or the like conductors are coupled with each other through the agency of a magnetic core or the like coupling means, for carrying out phase inversion, impedance transformation and the like operations over a broad band.

In the first embodiment of this kind of conventional transformer shown in FIG. 1a, distributed constant line L having input terminals $a$, $b$ and output terminals $c$, $d$ is coupled as shown with a magnetic core Cr, preferably shaped in a ring, so as to perform phase inversion at a ratio of 1:1. The higher frequency characteristic of this conventional transformer may be well understood from FIG. 1b which shows an equivalent circuit thereof, which has a characteristic that can be determined by the characteristic of the line L. The lower frequency characteristic may be well understood from FIG. 1c which is also an equivalent circuit of the transformer described so far, and thus is similar to the equivalent circuits of normal prior art transformers. The relation between the input and the output terminals can be reversed from that shown, when necessary. Several intermediate points are denoted throughout the FIGS. 1a, 1b and 1c by numerals 1, 2, 3 and 4 for easy comparison and identification.

In a second embodiment shown in FIG. 2a, having somewhat modified wiring connection, reference symbols: $a$, $b$, $c$, $d$, L and Cr denote same constituents of the transformer to those referred to above. There are shown, as before, several reference numerals 1, 2, 3 and 4 throughout FIGS. 2a, 2b and 2c, serving for comparison and identification. This transformer is adapted for performing an impedance transformation at a ratio of 1:4. In this transformer, the ratio of image impedances when seen at the input terminals $a$, $b$ and the output terminals $c$, $d$, respectively, will amount to 1:4. The relation between the inlet and the output terminals may be reversedly utilized as before, when necessary.

Generally speaking, in this kind of transformer, damping poles will appear at such frequencies which are odd multiples of a specific frequency a half wave length of which is equal to the electrical length of the transmission line L. An equivalent circuit at lower frequencies of the above transformer shown in FIG. 2a is shown in FIG. 2c which corresponds to that of a conventional kind of transformer.

In a third embodiment of conventional transformer shown in FIG. 3a, the distributed constant line as at L in the foregoing embodiments is divided into three elements $L_1$, $L_2$ and $L_3$. Distributed constant line elements $L_1$ and $L_2$ have equal values of characteristic impedance and connected at one of their ends in series with each other and at the other of their ends in parallel to each other. The last line element $L_3$ having a doubled value of characteristic impedance of line element $L_1$ or $L_2$, is connected electrically with the parallel-connected ends of the other line elements $L_1$ and $L_2$.

Figure 3C:
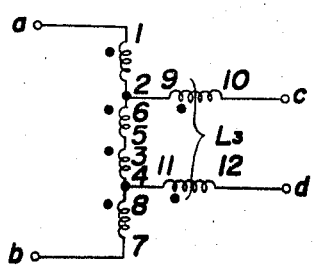

In FIGS. 3b and 3c, equivalent circuits for higher frequencies and for lower frequencies are shown, respectively, wherein reference symbols $a$, $b$, $c$, $d$ and $Cr$ and numerals 1–4 are respectively of same significance as before. In the present case, however, several further numerals 5–12 are added for clearer comparison and identification. The impedance ratio will be 4:1, as is easily understood from the drawing. Line element $L_3$ constitutes a kind of balance-unbalance transformer. If this element were removed from the circuit arrangement, the output would become balanced.

It will be noted from the foregoing that with any one of these conventional transformers, a plurality of them must be utilized connected in parallel, series or tandem, if it is desired to obtain a higher value of transformation ratio or any selected value thereof other than those specified above. This results in a bulk, complicated and uneconomical design of the whole transformer arrangement, which constitutes a considerable disadvantage of the prior art.

Figure 4A:
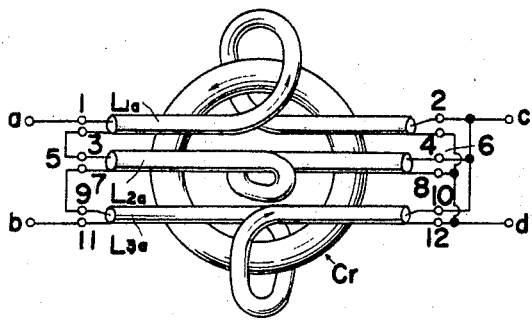
FIGS. 4a, 4b and 4c are similar views to FIGS. 1a, 1b and 1c, respectively, illustrating a first embodiment of the invention.
Figure 5A:
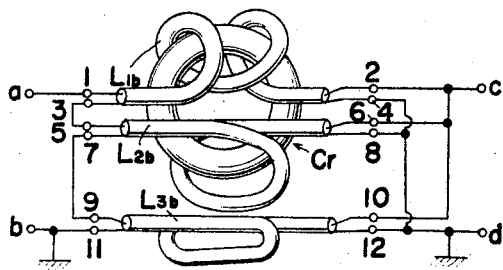
FIGS. 5a, 5b and 5c are similar views to FIGS. 1a, 1b, 1c, respectively, illustrating a second embodiment of the invention.

In FIGS. 4a and 5a, there are shown two embodiments of the transformer according to the present invention. The former is of the balanced type, while the latter is of the unbalanced type, yet each has a transformation ratio of 3:1 which may be expressed 9:1 in terms of the impedance ratio.

Figure 4B:
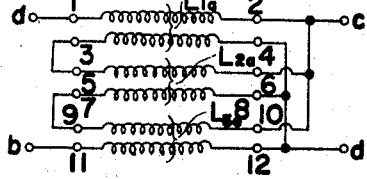

In the first embodiment shown in FIG. 4a, three distributed constant lines $L_{1a}$, $L_{1b}$ and $L_{1c}$, each having a specially selected common characteristic impedance value and a constant electrical length. The (inlets in this case) of these lines are connected in series with each other, while the other ends (outlets in this specific embodiment) of the lines are connected in parallel with each other. Lines $L_{1a}$ and $L_{3a}$ have an equal member of turns wound around in opposite phase relation to each other around ring core $Cr$, thus being coupled therewith, while the remaining line $L_{2a}$ is not coupled with the core. An equivalent circuit of the present embodiment in its higher frequency operating mode is seen in FIG. 4b, wherein symbols $a$, $b$, $c$ and $d$ and numerals 1–12 are of the same meaning as before. This equivalance applies also to the corresponding representation of FIG. 4a. In the equivalent circuit shown in FIG. 4b, it will be noted that in this case three ideal distributed constant lines are connected at one of their ends in series with each other and at the other of their ends in parallel with each other. This circuit connection provides clearly a ratio of transformation of 3:1. The cut-off frequency of this transformer is also determined by the selected value of the common characteristic impedance of the distributed constant lines which may be generally in the form of short coaxial lines or the like equivalent conductors. With use of the present embodiment therefore, favorable transmission performance can be easily realized even when operating with very high frequency signals such as those in the order of nano-seconds per cycle.

Figure 4C:
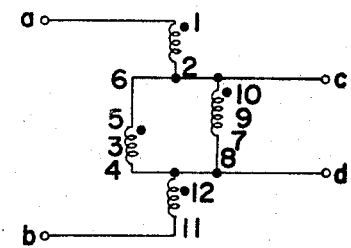

An equivalent circuit of the first embodiment at its lower frequency operating mode is shown in FIG. 4c, which may be considered as a regular transformer, the shut-off frequency in this operating mode depending upon the selected inductance values of the windings.

It will be well understood from the foregoing that in the above described embodiment the image impedance of the transformer when seen from the side of input (or output) terminals $a$, $b$ will amount to $3Z_0$, while the image impedance when seen from output (or input) terminals $c$, $d$ will be $\frac{1}{3} \cdot Z_0$, if the characteristic impedance of each of the constituting lines $L_{1a}$, $L_{2a}$ and $L_{3a}$ is assumed to be $Z_0$. It can be thus seen that the terminals $a$, $b$ and $c$, $d$ can be utilized under stabilized conditions relative to the mass.

Figure 5B:
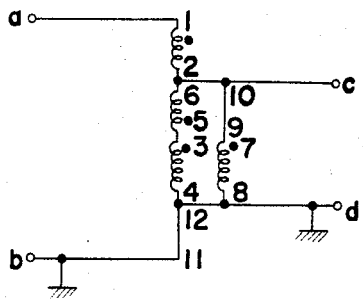
Figure 5C:
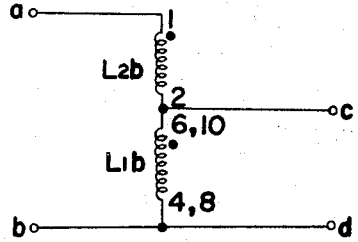

A second embodiment shown in FIG. 5a is of unbalanced type and comprises three distributed constant lines $L_{1b}$, $L_{2b}$ and $L_{3b}$, having a constant electrical length and a specific value of characteristic impedance. In the similar way as referred to above with reference to FIG. 4a, one end (here, the inlet) of each of these lines are connected in series to each other, while the other ends (here, the outlets) thereof are connected in parallel to each other. Lines $L_1$ and $L_2$ are coupled with ring core $Cr$ and wound around the core in a turns ratio of 2:1, and in the same winding direction when viewing from terminals $a$, $b$ as the starting point. An equivalent circuit of this second embodiment of the invention in its higher frequency mode is same as that shown in FIG. 4b, thus having same characteristic performance as the latter. A lower frequency mode of operation of the present embodiment is shown in the form of its equivalent circuit in FIG. 5b, which is also equivalent to a 1:1 transformer shown schematically in FIG. 5c. The terminals $b$, $d$ may be grounded, when necessary, as shown.

A generalized embodiment of the invention, schematically shown in FIG. 6a, is designed for performing the desired impedance transformation at an impedance ratio of $n^2:1$ or at a transforming ratio of $n:1$, $n$ being an integer larger than one. In this embodiment, one set of ends (more specifically the left-hand ends of distributed constant lines $L_1$, $L_2$, $L_3$ ... $L_n$, each having a specific characteristic impedance $Z_0$) are connected electrically in series with each other, while another set of ends (more specifically the right-hand ends of the lines) are connected electrically in parallel to each other. These lines are coupled with a magnetic core, which is not shown in this figure for clarity of the drawing, but which may be the ring core $Cr$ shown in the foregoing several figures, in the following generalized manner.

When denoting the number of turns of the $i$th one of the aforementioned, distributed constant lines having respective number of turns $N_1$, $N_2$ ... $N_n$, by $N_i$, then: For the balanced arrangement, $$N_i = k\left(\frac{n-1}{2}i + 1 -\right) \qquad (1)$$

where, $i = 1, 2, 3 \ldots, n$;

$k =$ a constant;

For the unbalanced arrangement, $$N_i = k(n-i) \qquad (2)$$

where, also $i = 1, 2, 3 \ldots, n$;

$k =$ a constant;

In the both arangements, the last line $Ln$ is grounded. The above formulae may have a plus or minus sign, according to the values of $n$ and $i$, or may be nil under some circumstances. The minus sign denotes that the $i$th line has an opposite winding direction relative to those which have plus signs. When the value of $N_i$ is nil, there there will be no coupled connection of the distributed constant line with the magnetic core. A higher frequency mode of equivalent circuit of the above embodiment can be treated as a combination of $n$ ideal distributed constant lines, first ends of which are connected electrically in series with each other, while the other ends of said lines are connected electrically in parallel to each other as in the aforementioned way, which equivalent arrangement is further equivalent to such a combination of distributed constant lines having a characteristic impedance of $nZ_0$ with an ideal transformer having a transformation ratio of $n:1$. The value of impedance $Z_0$ is that of each of the distributed constant lines $L_1$, $L_2$, $L_3$ ..., $L_n$ which are used. An equivalent circuit for the lower frequency mode of operation is shown in FIG. 7b. This equivalent circuit will be further equivalent to that shown either in FIG. 7c for the balanced mode, or in FIG. 7d for the unbalanced mode. In the arrangement shown in FIG. 7c, the number of turns of the line part ranging between points a–c and points b–d can be expressed, respectively, by $$\left(k \cdot \frac{n-1}{2}\right)$$

The corresponding value for the line part between points c–d will amount to k.

On the other hand, for the unbalanced mode of operation shown in FIG. 7d, the number of turns of the line part either between points a–c or b–d will be $k \cdot (n-1)$, while the corresponding value for the line part between points c–d will amount to k. It will be easily understood that by applying the general concept of this invention as judged from the several foregoing equivalent circuits, broad frequency band transformers having transforming ratios of n:1, when taken as n any selected integer.

According to the novel teaching as provided by the present invention, transformers capable of performing single-push-pull transformation with any selected impedance ratio (or transformation ratio) can be realized.

For instance, in a further embodiment shown in FIG. 8a, 2n pieces of distributed constant line (n being again any selected integer), denoted by $L_1, L_2, L_3 \ldots L_{2n}$ and having respective number of turns $N_1, N_2, N_3 \ldots N_{2n}$ in succession, are coupled with a magnetic core, not shown, such as that denoted by Cr in the foregoing, in the following way, when expressed mathematically by respective number of turns:

$$N_i = (2n-1)k$$

where, $$i = 1, 2, 3 \ldots, n$$

or $$N_i = (2n-i+1)k$$

where, $$i = n+1, n+2 \ldots, 2n$$

The direction of each of the windings varies according to the resulting plus or minus sign, respectively, of the $N_i$ equation.

Assuming in the same way throughout the foregoing several embodiments that each of the characteristic impedances of the said lines is $Z_0$, the image impedance of the transformer just described above, when seen from the side of terminals a–b, will be $4n^2 \cdot Z_0$, while that which is seen from the side of other terminals c–d or e–d will be $Z_0/n^2$.

In a still further embodiment shown in FIG. 8b, 2n pieces of distributed constant line $N_1, N_2, N_3 \ldots N_{2n}$ each having a constant characteristic impedance $Z_0$ as before, are coupled with a magnetic core, not shown, which may be again that denoted by Cr in the foregoing several embodiments, in the following way:

$$N_i = (n-i)k$$

where, $$i = 1, 2, 3 \ldots, 2n$$

The winding direction as obtained by the positive or negative sign should be determined from the side of terminals a–b. In this case, the image impedance when seen from the side of terminals a–b will be $Z_0/4n^2$, while that when observed from the side of terminals c–d or e–d will be $n^2 \cdot Z_0$. In the foregoing several embodiments, especially those shown in FIGS. 6 and 7b, several additional reference symbols such as 1a, 1b, 1c, 1d, nd, 2a, 2b, 2c, 2d, 3a, 3b, (n−1)a, (n−1)b, (n−1)c, (n−1)d, na, nb, nc, nd and the like are added for identification of several views, while in FIGS. 8a and 8b, a new additional terminal e is shown. The function thereof will be self-explanatory in reference to the foregoing description.

Figure 11:
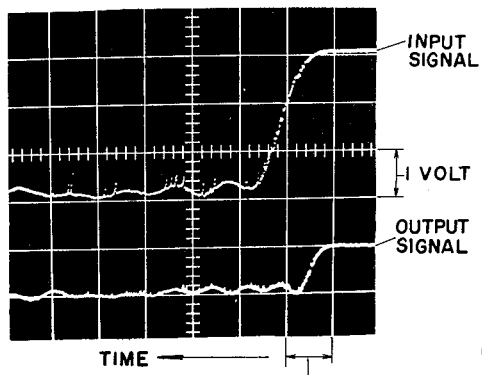
FIGS. 11 and 12 are oscillographs showing the working performance of the two experimental circuits shown in FIGS. 10 and 11, respectively.
Figure 9:
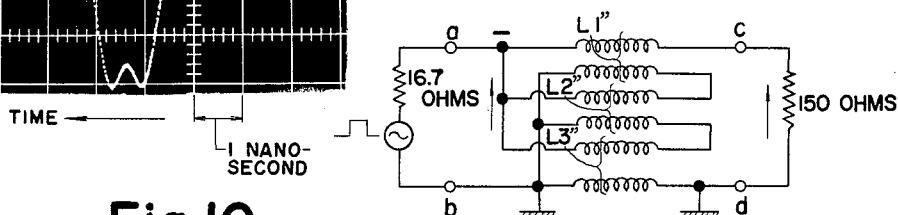
FIGS. 9 and 10 are two experimental circuit diagrams used for ascertaining the improved results of the inventive transformer.
Figure 10:
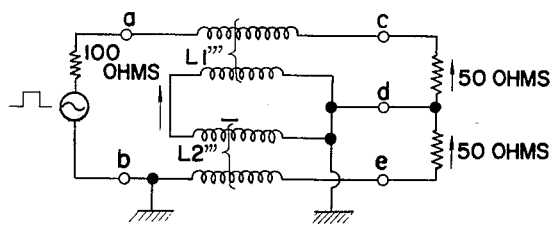

In FIG. 9, a 3:1 transformer, as expressed in an equivalent circuit, is shown. Each of the distributed constant lines is formed by two insulated parallel lines, having a characteristic impedance $Z_0 = 50$ ohms. The number of turns of $L_1''$ is 6; in $L_3''$ is nil; and in $L_2''$ is 3 turns. The magnetic core, not shown, has an outside diameter (O.D.) of 4 mm.; an inside diameter (I.D.) of 2 mm.; and permeability of 3300. With use of this transformer, a high speed transformation was attained, as shown in FIG. 11. The ideal form of input rectangular wave is shown at the left-hand side of FIG. 10. In FIG. 9, the time unit is 1 nanosecond. The signal voltage unit is 1 volt. This embodiment is similar to that shown in FIG. 5. As seen, the operating speed was remarkably high.

Figure 12:
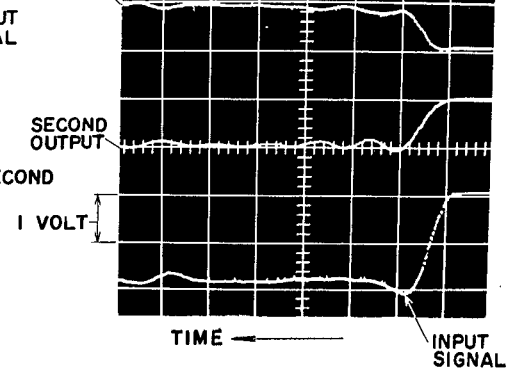

The next experimental transformer of 2:1:−1 is shown in FIG. 12. The characteristic data of the core were same as those set forth in reference to FIG. 9. $L_1'''$ has 3 turns; and $L_2'''$ has 3 turns. The distributed constant lines were same as before. The resulted performance is shown in FIG. 12.

Figure 13:
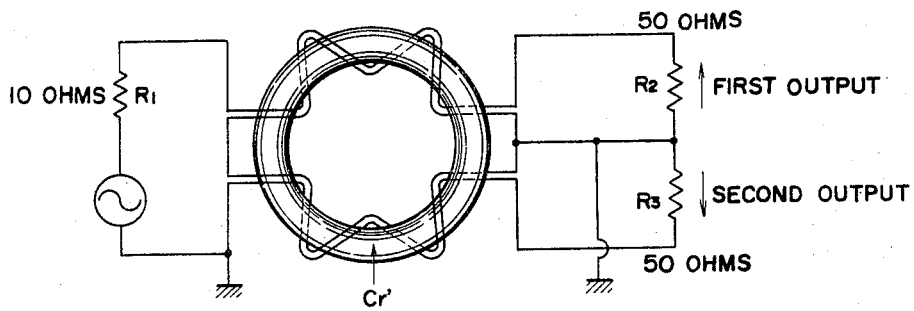
FIG. 13 is a schematic representation of a still further embodiment of the transformer according to the invention.
Figure 14:
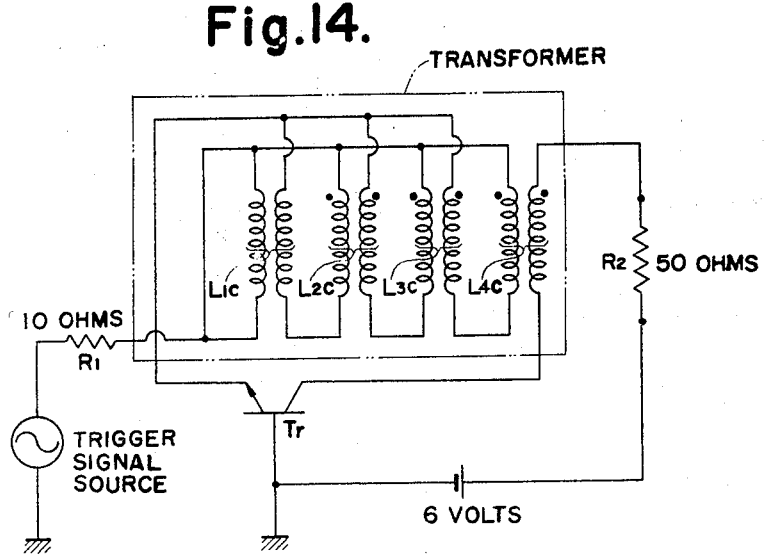
FIG. 14 is a wiring diagram of a transistored blocking oscillator comprising an embodiment of the transformer according to the invention.

A still further experimental embodiment is shown in FIGS. 13 and 14. A chain-dotted line block shown in FIG. 14 corresponds to the transformer shown in FIG. 13.

Figure 15:
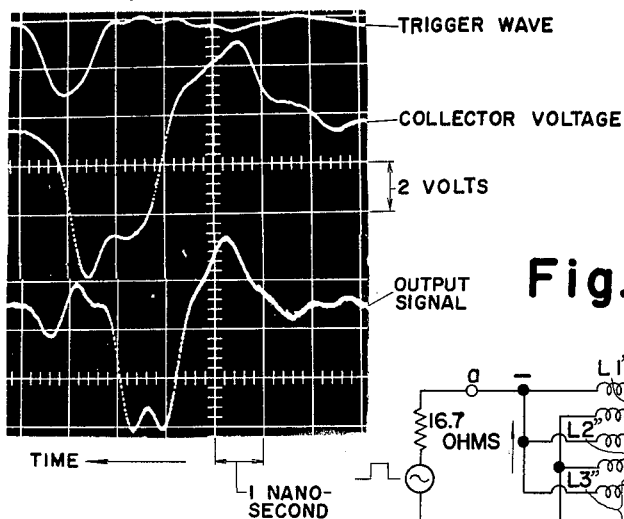
FIG. 15 is an oscillograph illustrating a trigger signal wave applied to the input of the blocking oscillator shown in FIG. 14, the collector current wave of the transistor inserted therein and the output signal wave delivered therefrom.

In this embodiment, a core Cr', having O.D. 6 mm.; I.D. 3 mm.; and thickness: 3 mm., was used. Permeability was 130. Two parallel lines, each being of 0.15 mm., were coupled with the core, and had a characteristic impedance of 50 ohms; $L_{1c}$ had 0 turn; $L_{2c}$ had 1 turn; $L_{3c}$ had 2 turns; and $L_{4c}$ had 3 turns. The blocking oscillator comprises a transistor Tr, model "FT1110," of silicon epitaxial planar type, having a gain-band width of 1200 mc. In the blocking oscillator, windings $L_{1c}, L_{2c}$ and $L_{3c}$ constitute in combination a feed back winding in effect, while the remaining winding $L_{4c}$ serves for the separation of the output signal. The operating mode of the blocking oscillator is shown in FIG. 15 in the form of an oscillograph. The characteristic impedance of each of the said four windings was selected to be 50 ohms. Resistor $R_1$, 10 ohms, inserted at the triggering side is provided for impedance matching. By modifying the characteristic impedance, the load resistance can be correspondingly adjusted.

From the foregoing detailed description, it will be clear that according to the novel teaching as proposed by the present invention, transformers with any selected integer value of transformation ratio can be realized in a highly simple manner. It is naturally conceivable that by adopting a series-combination of any selected number of the thus designed and completed transformers, any desired rational value of transformation can effectively be realized. The frequency characteristic of the transformer thus completed has a highest possible limit even in the order of nano-seconds per cycle. The distributed constant line may be a short length, for instance several centimeters, of coaxial line the construction of which is seen from an enlarged partially sectioned, perspective view shown in FIG. 6b. Conductors may be made naturally of copper, aluminum or the like, while the used insulator may be made from polyethylene resin or the like. Insulated parallel conductors may be used in place of coaxial line with equal results. The core material may be ferrite and the like which are commonly used by those skilled in the art for the production of high permeability cores. Therefore, the broad frequency band transformers according to this invention are highly useful especially for broad frequency band amplifiers which are desired to operate at a high speed.

Though the invention has been described in some detail with respect to several preferred embodiments disclosed herewith, it should be understood that variations thereto, altering the physical arrangement and combination of parts may be accomplished without departing from the spirit or scope of the invention, as set forth in the appended claims.

What we claim is:

1. A broad-band impedance-radio transformer comprising:
   (a) a single magnetic core, (b) at least three pairs of distributed constant lines, at least two of said pairs being wound about said core and at least one of said pairs not being wound about said core, each pair having first and second ends, each end having first and second line terminals, (c) means connected to the line terminals at the first end of each said pair for connecting said pairs in series at their first ends, and (d) means connected to the line terminals at the second end of each said pair for connecting said pairs in parallel at their second ends, whereby the degree of coupling of said lines is a function of the ratio of impedance transformation.

2. Transformer as set forth in claim 1, wherein said lines are insulated parallel conductors.

3. Transformer as set forth in claim 1, wherein said lines are coaxial conducting lines.

4. A broad-band impedance-ratio transformer according to claim 1, further comprising:

(a) first, second, third and fourth transformer terminals, said first and second transformer terminals forming an associated pair of transformer terminals and said third and fourth transformer terminals forming an associated pair of transformer terminals, one of said associated pairs being adapted to supply input power to said transformer and one of said associated pairs being adapted to furnish output power from said transformer, (b) said means for connecting said pairs in series further comprising:

(1) means for connecting with negligible impedance the first transformer terminal to the first line terminal of the first end of one of said pairs, (2) means for connecting with negligible impedance the second transformer terminal to the second line terminal of the first end of another one of said pairs, (3) means for connecting with negligible impedance each remaining otherwise unconnected second line terminal of the first end of any pair to a remaining otherwise unconnnected first line terminal of the first end of any pair, and (c) said means for connecting said pairs in parallel further comprising:

(1) means for connecting with negligible impedance all first line terminals of the second end of any pair of said third transformer terminal, and (2) means for connecting with negligible impedance all second line terminals of the second end of any pair to said fourth transformer terminal.

5. An unbalanced broad-band impedance-ratio transformer comprising:

(a) a single magnetic core, (b) a plurality $n$ of sets of distributed constant lines coupled to said core, said plurality comprising at least three sets, each said set having line terminals at a first end and terminals at a second end, (c) the $i$th set of said lines, where $i$ assumes all integer values from one to $n$ inclusive, forms a number $N_i$ of turns around said core, where $$N_i = K(n-i)$$

and where K is a constant, (d) means connected to the line terminals at said first end for connecting said sets in series at their first ends, and (e) means connected to the line terminals at their second end for connecting said sets in parallel at their second ends, whereby the degree of coupling of said lines is a function of the ratio of impedance transformation.

References Cited

UNITED STATES PATENTS

| | | | |
|---|---|---|---|
| 2,470,307 | 5/1949 | Guanella. | |
| 2,669,698 | 2/1954 | Delong | 333—24 |
| 2,865,006 | 12/1958 | Sabaroff | 333—33 |
| 3,114,120 | 12/1963 | Heck | 333—25 |
| 3,123,781 | 3/1964 | Winningstad | 333—24 XR |
| 3,357,023 | 12/1967 | Hemmie | 333—25 XR |

FOREIGN PATENTS

| | | |
|---|---|---|
| 811,351 | 4/1959 | Great Britain. |
| 1,176,024 | 11/1958 | France. |

ELI LIEBERMAN, *Primary Examiner.*

MARVIN NUSSBAUM, *Assistant Examiner.*

U.S. Cl. X.R.

333—26